United States Patent
Aarre et al.

(10) Patent No.: US 8,886,503 B2
(45) Date of Patent: Nov. 11, 2014

(54) DISCONTINUITY DETECTION

(75) Inventors: Victor Aarre, Stavanger (NO); Donatella Astratti, Abu Dhabi (AE)

(73) Assignee: Schlumberger Technology Corporation, Sugar Land, TX (US)

( * ) Notice: Subject to any disclaimer, the term of this patent is extended or adjusted under 35 U.S.C. 154(b) by 133 days.

(21) Appl. No.: 13/089,584

(22) Filed: Apr. 19, 2011

(65) Prior Publication Data

US 2012/0271608 A1    Oct. 25, 2012

(51) Int. Cl.
*G01V 1/00* (2006.01)
*G01V 1/28* (2006.01)
*G01V 1/30* (2006.01)
*G01V 99/00* (2009.01)
*G06T 17/10* (2006.01)

(52) U.S. Cl.
CPC ............... *G01V 99/00* (2013.01); *G06T 17/10* (2013.01)
USPC .................................. 703/10; 703/6; 382/190

(58) Field of Classification Search
CPC ..... G06T 7/004; G06T 7/0042; G06T 7/0046; G06T 7/0048; G06T 7/0067; G06T 7/0079; G06T 7/0085; G06T 7/0095
See application file for complete search history.

(56) References Cited

U.S. PATENT DOCUMENTS

| | | | |
|---|---|---|---|
| 4,293,933 A | 10/1981 | Park et al. | |
| 4,302,723 A | 11/1981 | Moran | |
| 4,316,250 A | 2/1982 | Vincent | |
| 5,892,732 A | 4/1999 | Gersztenkorn | |
| 5,987,388 A * | 11/1999 | Crawford et al. | ............... 702/16 |
| 6,125,203 A | 9/2000 | Keskes et al. | |
| 6,266,618 B1 | 7/2001 | Ye et al. | |
| 6,856,910 B2 | 2/2005 | Goswami et al. | |
| 7,202,670 B2 | 4/2007 | Omeragic et al. | |
| 7,203,342 B2 | 4/2007 | Pedersen | |
| 7,373,252 B2 | 5/2008 | Sherrill et al. | |
| 8,463,551 B2 | 6/2013 | Aarre | |
| 8,472,674 B2 | 6/2013 | Yevskyy et al. | |
| 2002/0022930 A1 * | 2/2002 | Bouts et al. | ..................... 702/14 |

(Continued)

FOREIGN PATENT DOCUMENTS

| | | |
|---|---|---|
| EP | 1274045 | 1/2003 |
| WO | 2005017564 | 2/2005 |
| WO | 2006055137 | 5/2006 |

OTHER PUBLICATIONS

Nasher M. AlBinHassan, Kurt Marfurt, Allied Geophysical Laboratories, University of Houston, Fault Detection Using Hough Transforms, Society of Exploration Geophysicists, 2003 SEG Annual Meeting, Oct. 26-31, 2003, Dallas, Texas.*

(Continued)

*Primary Examiner* — Kamini S Shah
*Assistant Examiner* — Michael P Healey
(74) *Attorney, Agent, or Firm* — Lam Nguyen; Rodney Warfford; Garrett Atkinson (57) ABSTRACT

Implementations of discontinuity detection are described. In one possible embodiment, information associated with a computer-generated model is accessed. A location associated with a feature in the model can be reviewed for possible discontinuity properties by comparing an orientation associated with the location to an orientation of a true normal to the feature associated with a specific point nearby the location. In one possible aspect, if the orientation associated with the location and the true normal are within a given range of one another, the location can be flagged as a possible discontinuity in the feature.

20 Claims, 6 Drawing Sheets

(56) References Cited

U.S. PATENT DOCUMENTS

| | | | |
|---|---|---|---|
| 2005/0083063 A1 | 4/2005 | Omeragic et al. | |
| 2009/0238488 A1* | 9/2009 | Joon-Ki et al. | 382/264 |
| 2010/0183198 A1 | 7/2010 | Yevskyy et al. | |
| 2012/0004849 A1 | 1/2012 | Aarre | |

OTHER PUBLICATIONS

Satinder Chopra, Seismic Attributes for Prospect Identification and Reservoir Characterization, 2007, Society of Exploration Geophysicists and European Association of Geoscientists and Engineers, pp. 25-44.*

Stanley R. Deans, Hough Transform from the Radon Transform, IEEE Transactions on Pattern Analysis and Machine Intelligence, vol. PAMI-3, No. 2, Mar. 1981, pp. 185-188.*

ENVI User's Guide: Filters, ENVI Online Help (Aug. 12, 2005), Available: http://geol.hu/data/online_help/ConvolutionFilters.html, Retrieved: Dec. 20, 2012.*

Dawkins, Paul, Equations of Planes, Calculus III, Copyright 2007, retrieved: http://tutorial.math.lamar.edu/Classes/CalcIII/EqnsOfPlanes.aspx on Apr. 24, 2013.*

Aarre, Globally Consistent Dip Estimation; Schlumberger Information Solutions; SEG 2010 Annual Meeting, pp. 1387-1391.

Iske, "Part 1: Automatic Fault Extraction Using Artificial Ants", Mathematical Methods and Modeling in Hydrocarbon Exploration and Production, Springer Verlag, Berlin, Heideberg, DE, 2005, pp. 107-116.

Kanezaki, A. et al, "Scale and Rotation Invariant Color Features for Weakly-Supervised Object Learning in 3D Space", 2011 IEEE International Conference on Computer Vision Workshops, 2011, pp. 617-624.

* cited by examiner

DISCONTINUITY DETECTION

BACKGROUND

Computers can be used to create a variety of models from mere ideas or information associated with existing objects. For example, information associated with a hydrocarbon reservoir, such as seismic and/or well data, can be collected and used by a computer to create a model of the reservoir and any wells within the reservoir.

Substantial effort is being placed into the creation of more precise models, and into the automation of steps used in the creation of these models.

SUMMARY

Implementations of discontinuity detection are described. In one possible embodiment, information associated with a computer-generated model is accessed. A location associated with a feature in the model can be reviewed for possible discontinuity properties by comparing an orientation associated with the location to an orientation of a true normal to the feature associated with a specific point nearby the location. In one possible aspect, if the orientation associated with the location and the true normal are within a given range of one another, the location can be flagged as a possible discontinuity in the feature.

This summary is provided to introduce a selection of concepts that are further described below in the detailed description. This summary is not intended to identify key or essential features of the claimed subject matter, nor is it intended to be used as an aid in determining the scope of the claimed subject matter.

BRIEF DESCRIPTION OF THE CONTENTS

The detailed description is described with reference to the accompanying figures. In the figures, the left-most digit of a reference number identifies the figure in which the reference number first appears. The use of the same reference numbers in different figures indicates similar or identical items.

DETAILED DESCRIPTION

This disclosure is directed to techniques for implementing discontinuity detection. More particularly, the techniques described herein allow for discontinuities in a feature of interest in a computer-generated model to be located regardless of an orientation of the feature.

For example, in one possible implementation, a feature of interest, such as geological surface in a computer-generated hydrocarbon reservoir model, may curve and bend throughout its length and width, forming complex shapes such as anticlines, synclines, and combinations thereof. Discontinuities can be found in such a feature by examining the orientation of points associated with the feature and comparing them with orientations of true normals associated with the feature proximate to the points. In one aspect, if the orientation of a point is close to that of a nearby true normal, then the point can be flagged as part of a discontinuity.

It will be understood that the term "oilfield services" as used in this disclosure means any operations associated with hydrocarbon, carbon, or water discovery, location, tracking, production, transportation, storage, and/or sequestration. This includes the characterization and modeling of a reservoir or production operation, as well as the modeling of behavior of the reservoir or the production operation.

Similarly, an earth model will be understood to include any model used within the oilfield services, mining, carbon sequestration, water location and/or water production industries. Earth models include various geological and/or geophysical data and models, reservoir models, pipe and production facility models, production well and injection well models, seismic models, microseismic models, and various interpretations of geological data and/or geophysical data, etc.

It will further be understood that the term "oilfield services application" as used herein includes any application configured to carry out an oilfield services operation and/or workflow, including applications that create or manipulate earth models or any other models useful in oilfield services operations.

Additionally, even though many examples of discontinuity detection in this disclosure are given in the context of oilfield services, the concepts of discontinuity detection may be used in any other field known in the art in which users may have an interest in finding discontinuities in a feature of interest. These fields can include, for example, medical imagery, and various material diagnostic/examination fields.

Example Environment

Figure 1:
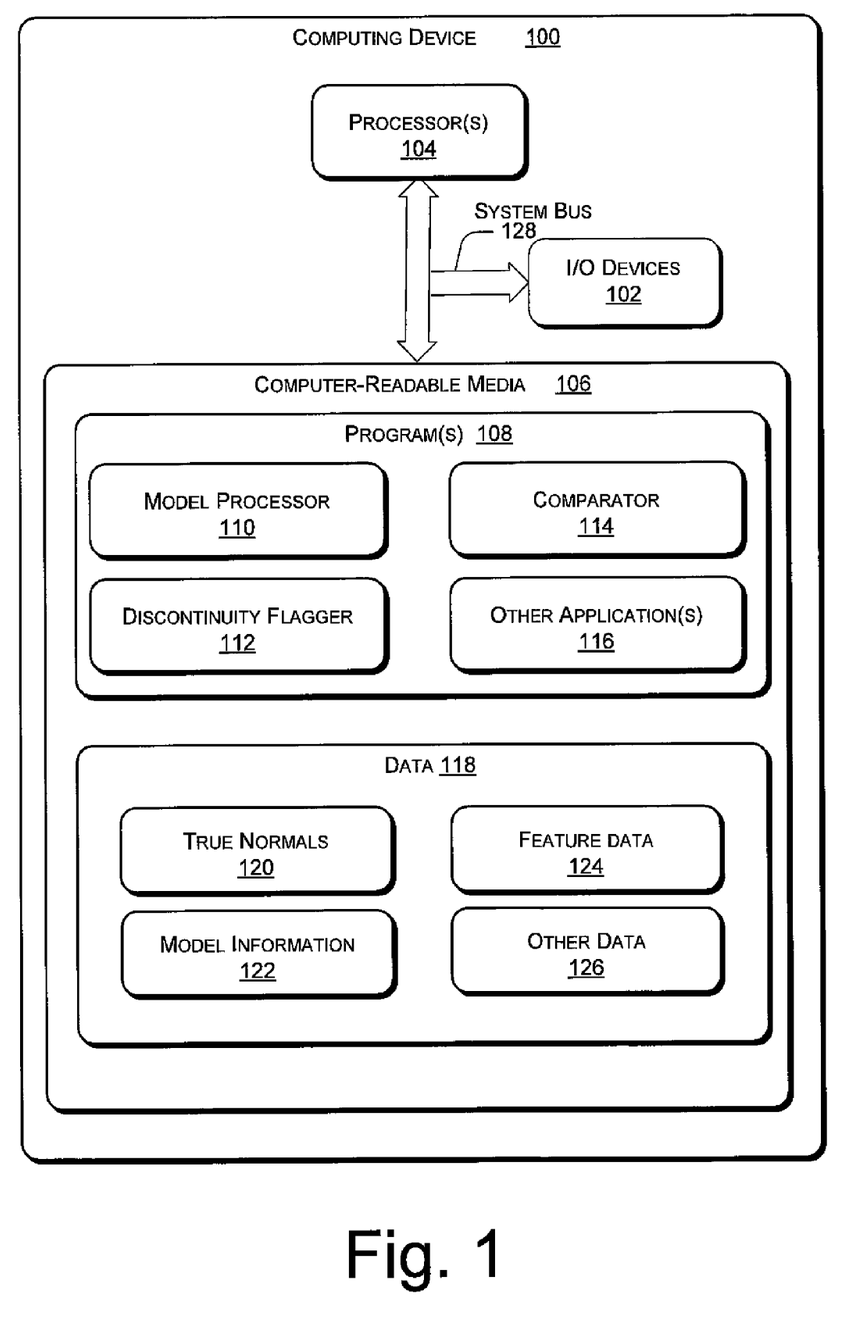
FIG. 1 illustrates an example computing device on which elements of discontinuity detection can be implemented.

FIG. 1 shows an example computing device 100 suitable for implementing embodiments of discontinuity detection. Computing device 100 can be implemented as any form of computing and/or electronic device. For example, computing device 100 can include a server, a desktop PC, a notebook or portable computer, a workstation, a mainframe computer, an Internet appliance and so on. Computing device 100 can include input/output (I/O) devices 102, one or more processor(s) 104, and computer-readable media 106.

I/O devices 102 can include any device over which data and/or instructions can be transmitted or received by computing device 100. For example, I/O devices 102 can include one or more of an optical disk drive, a USB device, a keyboard, a touch screen, a monitor, a mouse, a digitizer, a scanner, a track ball, etc.

I/O devices 102 can also include one or more communication interface(s) implemented as any of one or more of a serial and/or parallel interface, a wireless interface, any type of network interface, a modem, a network interface card, or any other type of communication interface capable of connecting computing device 100 to a network or to another computing or electrical device.

Processor(s) 104 include microprocessors, controllers, graphic processing unit(s) and the like configured to process various computer executable instructions controlling the operation of computing device 100. For example, processor(s) 104 can enable computing device 100 to communicate with other electronic and computing devices, and to process instructions and data in conjunction with programs 108 stored in computer-readable media 106.

Computer-readable media 106, can include one or more memory components including random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer-readable media 106 provides storage mechanisms to store various information and/or data such as software applications and any other types of information and data related to operational aspects of computing device 100. For example, programs 108 stored on computer-readable media 106 can include a model processor application 110, such as an application allowing for the creation, modification, and/or manipulation of an earth model (including, for example, a seismic processing application, a seismic interpretation application, a reservoir modeling application, a reservoir simulation application, a production application—such as from facilities and/or reservoirs—or any other OFS applications known in the art.

Programs 108 can additionally include a discontinuity flagger 112, a comparator 114, and other programs 116—such as an operating system and/or assorted application programs. Programs 108 can be executed on processor(s) 104. It will also be noted that some of programs 108 may be associated with one another, or may be subsets of one another. For example, discontinuity flagger 112 could be a part of model processor 110.

Computer-readable media 106 can also include data 118. For example, as illustrated in FIG. 1, data 118 residing on computer-readable media 106 can include information associated with true normals 120, model information 122, feature data 124, and other data 126 (including intermediate and final data created through use of one or more of programs 108).

Any of programs 108 and data 118 can reside wholly or partially on any of a variety of media types found in computer-readable media 106. For example, portions of comparator 114 can reside at different times in random access memory (RAM), read only memory (ROM), optical storage discs (such as CDs and DVDs), floppy disks, optical devices, flash devices, etc.

A system bus 128 can couple one or more of the processor(s) 104, I/O devices 102 and computer-readable media 106 to each other, System bus 128 can include one or more of any of several types of bus structures, including a memory bus or memory controller, a peripheral bus, an accelerated graphics port, and a processor or local bus using any of a variety of bus architectures. By way of example, such architectures can include a peripheral component interconnects (PCI) bus also known as a mezzanine bus, and so on.

Examples of Discontinuity Detection

Figure 2:
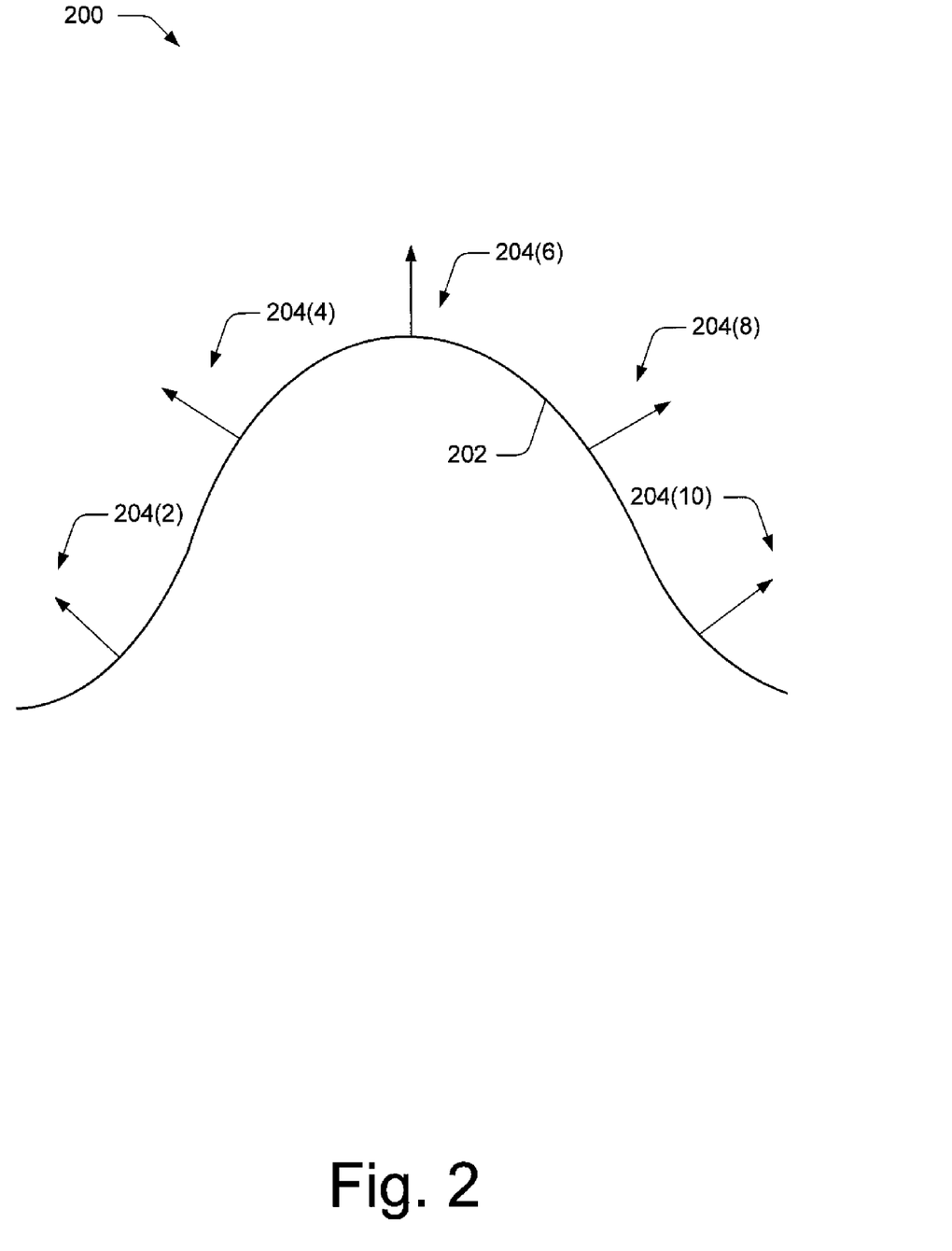
FIG. 2 illustrates an example feature in a computer-generated model in accordance with one embodiment of discontinuity detection.

FIG. 2 illustrates a computer-generated model 200 including a feature 202 in accordance with one embodiment of discontinuity detection. Model 200 can comprise any computer-generated model, including models such as medical images and earth models. Feature 202 can include any feature of interest in model 200, such as a geological surface, an interface between geological surfaces, a pressure front of a fluid, and so on.

As depicted in FIG. 2, feature 202 need not be strictly planar. Instead feature 202 can undulate, and can therefore have a true normal associated therewith exhibiting a variety of orientations. For example, normals 204(2) and 204(10) to the surface of feature 202 are approximately perpendicular to one another. Similarly, normals 204(4), 204(6) and 204(8) have orientations that are noticeably dissimilar to one another.

For the sake of graphic clarity feature 202 is drawn in two dimensions. In many scenarios, however, model 200 will be a three dimensional representation and feature 202 will extend into three dimensions. In such a case the diversity of orientations of normals 204(2)-204(10) can be even more pronounced that illustrated in FIG. 2.

Normals 204(2)-204(10) are shown in FIG. 2 as being associated with a surface of feature 202. It will also be understood, however, that normals 204(2)-204(10) can be associated with any points within a feature 202 if the feature 202 has a thickness (such as would be expected with a geologic layer).

Figure 3:
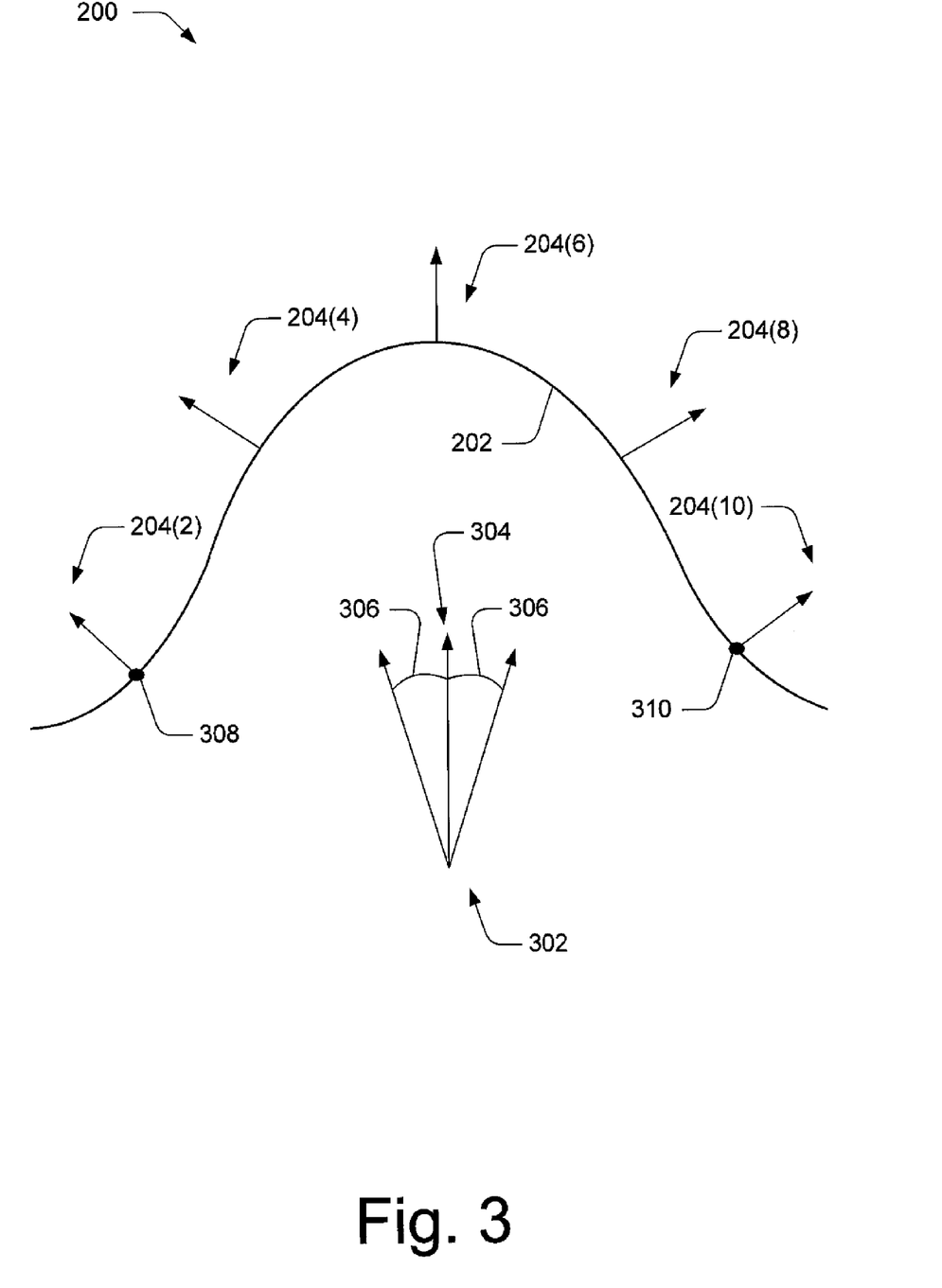
FIG. 3 illustrates an example feature in a computer-generated model in which edge detection can be practiced in accordance with another embodiment of discontinuity detection.

FIG. 3 illustrates one possible way to attempt to identify discontinuities in feature 202. A filter 302 can be employed with various points associated with feature 202 and orientations associated with those points can be compared to an absolute normal 304. In one possible implementation, absolute normal 304 is the normal which would exist if feature 202 was uniformly flat and had no undulations. In another possible implementation absolute normal 304 is a normal from the center of the earth through feature 202.

Filter 302 includes ranges 306 from absolute normal 304 that can, for instance, be preset by a user. In one implementation, points in feature 202 having orientations parallel to a normal associated with feature 202 can be flagged as being a possible discontinuity in feature 202.

In the instant case, a user can set ranges 306 in order to flag points with orientations that are close to being parallel to absolute normal 304 within any given tolerance defined by ranges 306.

For example, a user can set ranges 306 to be 15 degrees. In such a case, if a point's orientation is within 10 degrees of being parallel to the orientation of absolute normal 304, the point's orientation will be within the tolerance of filter 302 and therefore the point can be flagged as a discontinuity in feature 202. Conversely, if a point has an orientation outside of this range, and is, for example, 20 degrees off the orientation of absolute normal 304, the point is not flagged because it is seen as being outside the tolerance defined by ranges 306.

One issue with such a method arises when feature 202 undulates or departs from a flat orientation. In such a case, absolute normal 304 may be a poor approximation of a true normal to feature 202 at a variety of locations on feature 202.

For instance, looking at points 308 and 310 associated with feature 202, the orientation of absolute normal 304 is quite different than the orientations of true normals 204(2) and 204(10) associated with points 308 and 310, respectively. Therefore if a discontinuity exists at, or near, point 308 orientations of locations associated with the discontinuity can be expected to be close to parallel with normal 204(2). As such, these orientations may not be within the tolerance defined by ranges 306 of the orientation of absolute normal 304, and consequently the locations of the discontinuity at or near point 308 will erroneously not be flagged as part of a possible discontinuity.

Similarly, another point associated with feature 202 may be erroneously flagged as part of a possible discontinuity based on its orientation relative to absolute normal 304 even though the point's orientation may be nowhere near parallel to the orientation of a true normal 204(2)-204(10) from feature 202 proximate to the point.

In addition to filter 302 shown in FIG. 3, discontinuity detection also contemplates the use of any other filters known in the art. For example, when model 200 is three dimensional in scope, a filter can be used defining ranges 306 in three dimensions. This can be done using polar coordinates, Cartesian coordinates, a combination thereof, or any other coordinate or orientation systems known in the art.

For instance, when model 200 is an earth model, filter 302 may rely on dip and azimuth information, such that ranges 306 can be set in terms of dips and azimuths.

Figure 4:
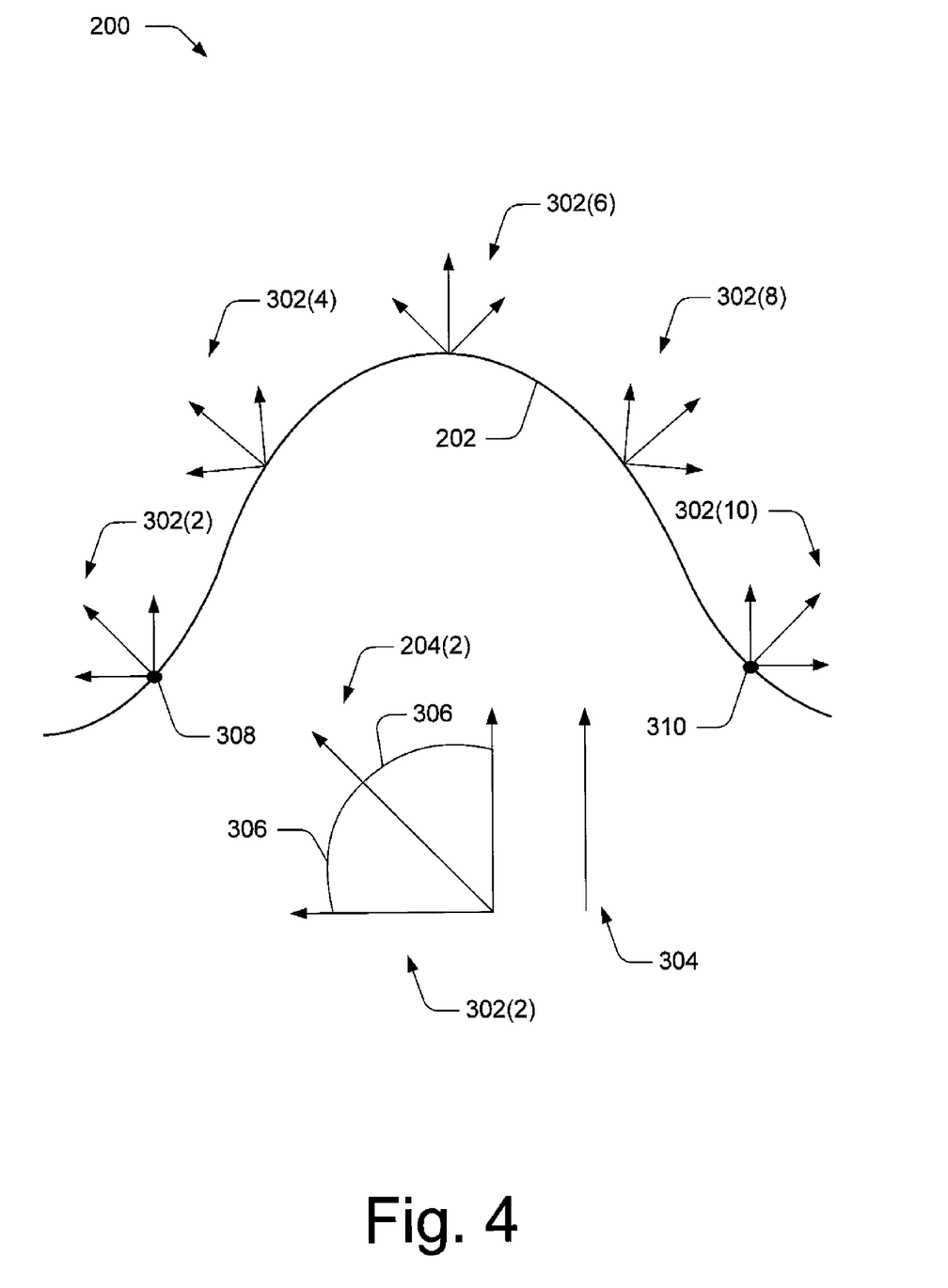
FIG. 4 illustrates an example feature in a computer-generated model in which edge detection is being practiced in accordance with yet another embodiment of discontinuity detection.

FIG. 4 illustrates another possible implementation in which discontinuities in feature 202 may be detected. Here instead of utilizing absolute normal 304, filters 302(2)-302(10) utilize true normals 204(2)-204(10) (see FIG. 3) in conjunction with ranges 306.

For ease of inspection filter 302(2) has been enlarged up in FIG. 4. It can be quickly noted that the orientation of true normal 204(4) to feature 202 at point 308 varies substantially from the orientation of absolute normal 304. As such, true normal 204(4) can be expected to lead to improved results when filter 302(2) is used to flag points that may be associated with discontinuities nearby or proximate to point 308.

For example, if a discontinuity exists close to point 308, orientations associated with locations in the discontinuity could be assumed to be close to parallel to the orientation of true normal 204(2), but not parallel with the orientation of absolute normal 304. Therefore users wishing to correctly flag points in a discontinuity close to point 308 can employ smaller ranges 306 in filter 302(2) than they could in filter 302 employing absolute normal 304. Or, stated another way, if the same ranges 306 are used with filters 302 and 302(2) when reviewing the orientations of locations near point 308, filter 302(2) will give more precise results with less noise (that is, less points will be flagged that aren't associated with the nearby discontinuity than would be flagged through use of filter 302).

The methods shown in Fig.4 can be used in a variety of ways. For example, true normals 204(2)-204(10) (see FIG. 3) at a variety of positions on or in feature 202 may be precalcuated and stored. Then one or more points associated with feature 202 can be examined by comparing their orientations to those of nearby true normals 204(2)-204(10). If the orientations of the points are close to being parallel to the orientations of the nearby or proximate true normals 204(2)-204(10), then the points can be flagged as possibly being part of a discontinuity.

Alternately, once a point of interest in model 200 is chosen, a true normal (e.g., one or more of true normal 204(2)-204(10)) to feature 202 can be calculated proximate to the point, and the orientation of the true normal 204 can be compared to the orientation of the point using the methods discussed above.

Example Implementation(s)

In one particular example of discontinuity detection in the field of earth models, dip/azimuth constrained edge enhancement can be performed with dip/azimuth being relative to normals 204(2)-204(10) of feature 202 (rather than having dip/azimuths relative to absolute normal 304). In such an implementation local structural dip and azimuth of feature 202 can be calculated before edge enhancement processes are fully pursued. Calculation of local structural dip and azimuth of feature 202 can be done in any manner known in the art.

In one possible embodiment, when an input 3D edge attribute volume (such as model 200), corresponding pre-calculated dip/azimuth 3D fields, and a table specifying which dip/azimuth angles the filter is desired to pass through, are all available, edge enhancement can be conducted relative to estimated local normal vectors, such as true normals 204(2)-204(10).

In one aspect, based on a local dip/azimuth, the input attribute volume can be vertically stretched/squeezed into a 3D coordinate system where all layers become flat in the new coordinate system. In one implementation this can include the process of "horizon flattening".

Any number and type of edge enhancement processes can then be run on the flattened volume, as all local surface normal vectors will be vertical in that space. The results can then be transferred back to the original coordinate system (i.e. perform "un-flattening" of the result).

In another aspect, edge enhancement can be conducted using any method known in the art, and with no constraints on dip/azimuth (i.e. pass on all detected edges). Subsequently a post-processing step can be run for each output pixel (in 2D) or voxel (in 3D) and local dip/azimuth can be calculated. The output pixels or voxels can then be assessed to determine if they are within the local range of valid dip/azimuth.

If they are, the pixels/voxels can be allowed to pass through to a final output. If, on the other hand, the pixels/voxels are outside the range, a value which indicates that this point is not an edge point can be output.

In still another possible aspect, a particular edge enhancement process can be used to accept an estimated local dip/azimuth field at any pixel/voxel and acknowledge that a valid dip/azimuth range is dependent on both global polar plot constraints and a local dip. This means that, e.g., for the implementation of an AntTracking process (such as is described in issued U.S. Pat. No. 7,203,342 to Pedersen, which is incorporated in its entirety herein by reference), a choice of valid directions any artificial ant can take, at any given location, can be determined by both the local dip/azimuth estimate and the settings in the global polar plot.

Similarly, for a windowed Radon approach, for each point valid dip and azimuth ranges can be calculated then scanned over all angles/azimuths within that local range. The strongest edge candidate (which by definition will be within that valid range) can then be chosen. Such an approach will select the strongest edges within the valid constraints while ignoring "stronger" edges outside the valid local dip/azimuth range. And this can be accomplished without stretch/squeeze artifacts due to pre- or post-conditioning steps as might be encountered when using horizon flattening or un-flattening.

Example Methods

Figure 5:
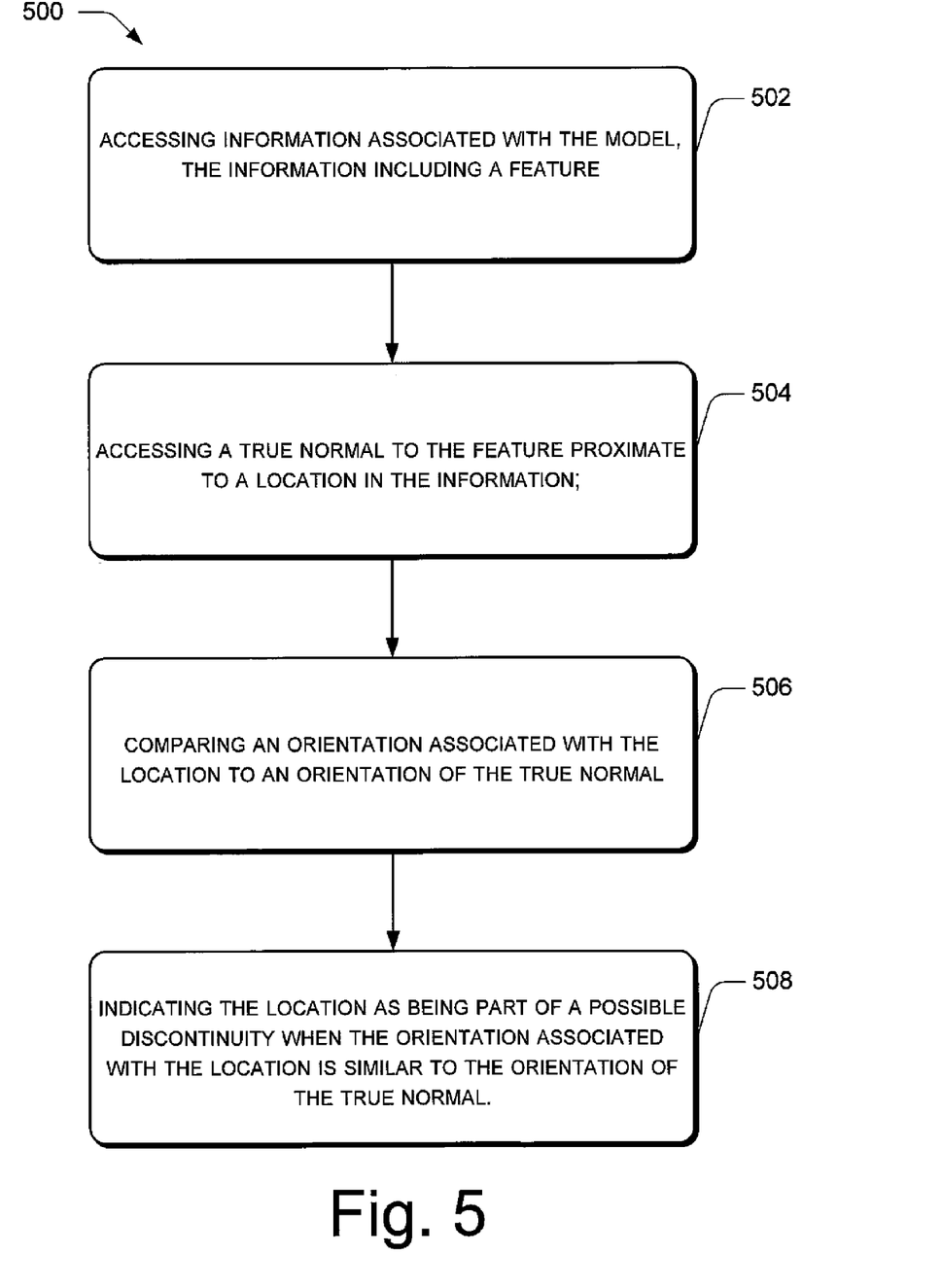
FIG. 5 illustrates example method(s) of discontinuity detection.
Figure 6:
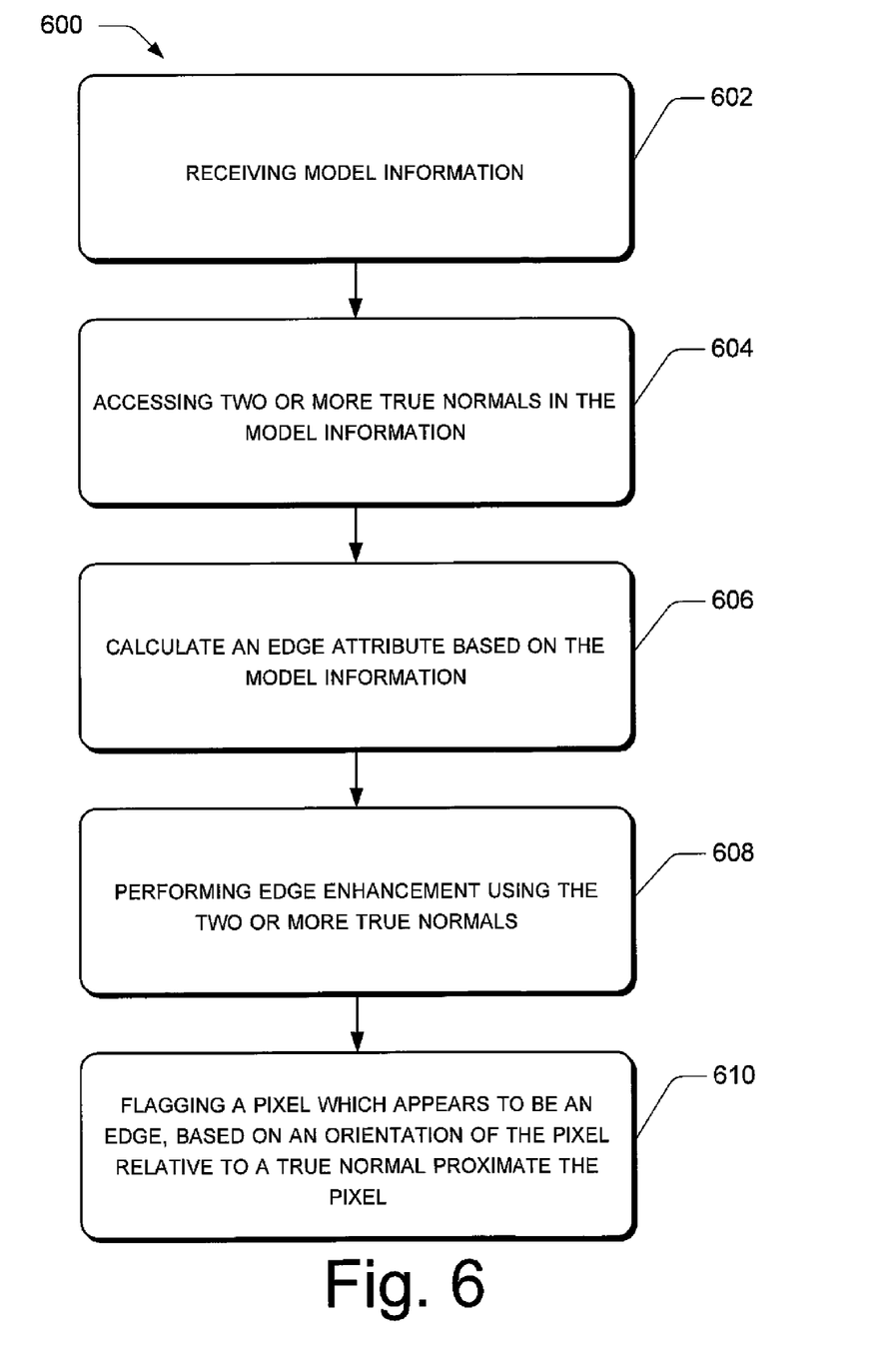
FIG. 6 illustrates example method(s) of discontinuity detection.

FIGS. 5-6 illustrate example methods for implementing aspects of discontinuity detection. The methods are illustrated as a collection of blocks in a logical flow graph representing a sequence of operations that can be implemented in hardware, software, firmware, various logic or any combination thereof. The order in which the methods are described is not intended to be construed as a limitation, and any number of the described method blocks can be combined in any order to implement the methods, or alternate methods. Additionally, individual blocks may be deleted from the methods without departing from the spirit and scope of the subject matter described therein. In the context of software, the blocks can represent computer instructions that, when executed by one or more processors, perform the recited operations. Moreover, for discussion purposes, and not purposes of limitation, selected aspects of the methods may described with reference to elements shown in FIGS. 1-4.

Example Methods I

FIG. 5 illustrates example method(s) 500 for implementing discontinuity detection.

At block 502, information associated with a computer-generated model, such as model 200, including a feature, such as feature 202 is accessed. In one possible implementation, this is accomplished through use of a model processor such as model processor 110.

At block 504 a true normal to the feature, proximate to a location in the information is accessed. In one implementation, the location corresponds to a location in the model where a discontinuity may exist, or where a user would like to investigate such a possibility.

At block 506 an orientation associated with the location is compared to an orientation of the true normal. In one implementation this is done by a comparator such as comparator 114. Comparisons can be done using various filters, such as filter 302, having preset ranges of interest, such as ranges 306.

At block 508 the location can be indicated as being part of a possible discontinuity if the orientation associated with the location is similar to the orientation of the true normal. In one implementation, the two orientations can be seen as being similar if they are within a tolerance defined by one or more preset ranges, such as ranges 306. In another possible implementation, when it is believed that the location is part of a possible discontinuity, the location is flagged as such. This can be done, for example, by elements such as discontinuity flagger 112.

Example Methods II

FIG. 6 illustrates more example method(s) 600 for implementing discontinuity detection. At block 602 model information, such as model information 122, from a computer-generated model, such as model 200 is received. In one implementation, the model information is received in earth model simulator software.

At block 604 two or more true normals in the model information are accessed. In one implementation these true normals can be true normals 204(2)-204(10) and they can be precalculated or calculated on the fly at various locations on, or in, a feature, such as feature 202, in the model information.

At block 606 an edge attribute can be calculated based on the model information. This calculation can be done using any method known in the art.

At block 608, edge enhancement can be performed using the two or more true normals. Edge enhancement can be performed using any method known in the art including, AntTracking, Windowed Radon Transforms, Hough Transforms, etc.

At block 610 a pixel which appears to be an edge can be flagged. In one implementation a pixel appears to be an edge if it has an associated orientation similar to that of a true normal proximate the pixel Conclusion Although embodiments of discontinuity detection have been described in language specific to structural features and/or methods, it is to be understood that the subject of the appended claims is not necessarily limited to the specific features or methods described. Rather, the specific features and methods are disclosed as example implementations of discontinuity detection.

What is claimed is:

1. A method of detecting a discontinuity in a computer-generated model comprising:
   accessing, using a processor, information associated with the model, the information including a feature;
   accessing, using the processor, a true normal to the feature proximate to a location in the information;
   comparing, using the processor, an orientation associated with the location to an orientation of the true normal; and
   indicating, using the processor, the location as being part of a possible discontinuity when the orientation associated with the location is within a preset angular range of the orientation of the true normal.

2. The method of claim 1, wherein the accessing information includes receiving a synthetic cube from a reservoir simulation model.

3. The method of claim 1, wherein the accessing the true normal includes calculating the true normal associated with a geological surface.

4. The method of claim 1, wherein the accessing the true normal includes accessing data including several true normals calculated at corresponding locations on the feature, and selecting one of the several true normals nearest to the location.

5. The method of claim 1, wherein the accessing the true normal includes calculating the true normal at a specific point on the feature.

6. The method of claim 1, wherein the comparing the orientation associated with the location to the orientation of the true normal includes subjecting the orientation associated with the location to one or more predefined filter ranges dependent on the orientation of the true normal as preset by a user.

7. The method of claim 1, wherein the indicating includes flagging the location as an edge when the orientation associated with the location is within the preset range of the orientation of the true normal.

8. The method of claim 7, further comprising:
   registering the preset range in terms of azimuth and dip information.

9. A non-transitory computer-readable medium having a set of computer-readable instructions residing thereon that, when executed, direct a processor to perform acts comprising:
   receiving model information, the model information including a feature;
   accessing two or more true normals to the feature at various locations on the feature in the model information;
   calculating an edge attribute based on the model information;
   performing edge enhancement using the two or more true normals and said edge attribute; and
   flagging a pixel as a possible discontinuity or as an edge, based on an orientation of the pixel being within a predefined angular range of a true normal of said two or more true normals proximate the pixel.

10. The non-transitory computer-readable medium of claim 9, wherein the acts further comprise:
    calculating the two or more true normals at said various locations in said feature in the model.

11. The non-transitory computer-readable medium of claim 9, wherein the acts further comprise:
    performing edge enhancement using information including local dip and azimuth information.

12. The non-transitory computer-readable medium of claim 9, wherein said edge enhancement is performed using a windowed radon transform.

13. A non-transitory computer-readable medium having a set of computer-readable instructions residing thereon that, when executed, direct a processor to perform acts comprising:
- accessing information associated with a model, the information including a feature;
- accessing a true normal to the feature proximate to a location in the information;
- comparing an orientation associated with the location to an orientation of the true normal; and
- indicating the location as being part of a possible discontinuity when the orientation associated with the location is within a preset angular range of the orientation of the true normal.

14. The non-transitory computer-readable medium of claim 13, wherein the acts further comprise:
- receiving seismic information from a reservoir simulation model.

15. The non-transitory computer-readable medium of claim 13, wherein the acts further comprise:
- calculating the true normal in a geological surface.

16. The non-transitory computer-readable medium of claim 13, wherein said accessing the true normal comprises:
- accessing data including several true normals calculated at various points on the feature, and selecting one of said several true normals, said selected one of said several true normals being nearest to the location.

17. The non-transitory computer-readable medium of claim 13, wherein the acts further comprise:
- calculating the true normal at a specific point on the feature.

18. The non-transitory computer-readable medium of claim 13, wherein the acts further comprise:
- subjecting the orientation associated with the location to one or more predefined filter ranges dependent on the orientation of the true normal as preset by a user.

19. The non-transitory computer-readable medium of claim 13, wherein said indicating comprises:
- flagging the location as an edge when the orientation associated with the location is within the preset range of the orientation of the true normal.

20. The non-transitory computer-readable medium of claim 13, wherein the acts further comprise:
- allowing a user to input the preset range using azimuth and dip information.

* * * * *